(12) United States Patent
Storck

(10) Patent No.: US 9,586,558 B2
(45) Date of Patent: Mar. 7, 2017

(54) BUCKLE ASSEMBLY FOR A VEHICLE

(71) Applicant: GM GLOBAL TECHNOLOGY OPERATIONS LLC, Detroit, MI (US)

(72) Inventor: Kevin J. Storck, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/317,761

(22) Filed: Jun. 27, 2014

(65) Prior Publication Data

US 2015/0115588 A1   Apr. 30, 2015

Related U.S. Application Data

(60) Provisional application No. 61/897,628, filed on Oct. 30, 2013.

(51) Int. Cl.
| | |
|---|---|
| *B60R 22/26* | (2006.01) |
| *B60R 22/22* | (2006.01) |
| *B60R 22/18* | (2006.01) |

(52) U.S. Cl.
CPC .............. *B60R 22/26* (2013.01); *B60R 22/18* (2013.01); *B60R 22/22* (2013.01); *B60R 2022/1806* (2013.01)

(58) Field of Classification Search
CPC . B60R 2022/1806; B60R 22/26; B60R 22/18; B60R 2021/23538
USPC ..................................................... 280/801.1
See application file for complete search history.

(56) References Cited

U.S. PATENT DOCUMENTS

| | | |
|---|---|---|
| 4,372,580 A | 2/1983 | Motonami et al. |
| 6,126,200 A | 10/2000 | Bell et al. |
| 6,808,197 B2 * | 10/2004 | Bauer .................... B23K 26/03 |
| | | 280/728.3 |
| 7,845,734 B2 | 12/2010 | Gomi et al. |

(Continued)

FOREIGN PATENT DOCUMENTS

| | | |
|---|---|---|
| CN | 101678813 A | 3/2010 |
| EP | 2399477 A1 | 12/2011 |

(Continued)

OTHER PUBLICATIONS

Ando et al. JP 2010-076681 English Machine Translation.*

*Primary Examiner* — Karen Beck
(74) *Attorney, Agent, or Firm* — Quinn Law Group, PLLC

(57) ABSTRACT

A buckle assembly for a vehicle includes a buckle member, an anchor bracket, and a webbing strap. The buckle member includes a connector that defines a buckle opening. The anchor bracket is operatively disposed in adjacent relationship to the buckle member and is configured for attachment to the vehicle. The anchor bracket defines a anchor opening. The webbing strap extends between a first strap portion and a second strap portion to form a loop portion therebetween. The webbing strap presents a first side and a second side, opposing the first side. The loop portion of the webbing strap extends through the buckle opening of the connector and the anchor opening of the anchor bracket. The first side of the first strap portion and the first side of the second strap portion are disposed in facing relationship to one another and a joint is formed therebetween.

17 Claims, 4 Drawing Sheets

(56) References Cited

U.S. PATENT DOCUMENTS

| | | | | |
|---|---|---|---|---|
| 7,919,036 B2* | 4/2011 | Bauer | ............... | B23K 26/03 219/121.7 |
| 8,434,786 B2* | 5/2013 | Jang | ............... | B60R 21/2338 280/739 |
| 8,544,883 B2* | 10/2013 | Fischer | ............... | B60R 21/233 280/743.2 |
| 8,727,378 B2* | 5/2014 | Hiruta | ............... | B60R 21/203 280/739 |
| 2002/0189879 A1* | 12/2002 | Jitsui | ............... | B60R 22/18 180/268 |
| 2007/0207233 A1* | 9/2007 | Bauer | ............... | B23K 26/03 425/141 |
| 2009/0273223 A1* | 11/2009 | Gomi | ............... | B60R 22/26 297/481 |
| 2012/0032428 A1* | 2/2012 | Tamura | ............... | B60R 21/0134 280/735 |
| 2012/0276320 A1* | 11/2012 | Zalewski | ............... | B29C 65/4835 428/61 |
| 2013/0249204 A1* | 9/2013 | Fink | ............... | B60R 22/024 280/801.1 |
| 2014/0238082 A1* | 8/2014 | Meir | ............... | D04B 15/90 66/64 |
| 2014/0373313 A1* | 12/2014 | Haas | ............... | B60R 22/22 24/302 |
| 2015/0014975 A1* | 1/2015 | Bahattab | ............... | B60R 22/32 280/801.1 |
| 2015/0021895 A1* | 1/2015 | Hirako | ............... | B60R 22/26 280/801.1 |
| 2015/0021896 A1* | 1/2015 | Okano | ............... | A44B 11/2561 280/807 |
| 2015/0035265 A1* | 2/2015 | Rouhana | ............... | B60R 22/28 280/808 |
| 2015/0115588 A1* | 4/2015 | Storck | ............... | B60R 22/22 280/801.1 |

FOREIGN PATENT DOCUMENTS

| | | |
|---|---|---|
| JP | 2010076681 A | 4/2010 |
| JP | 2010083396 A | 4/2010 |

* cited by examiner

BUCKLE ASSEMBLY FOR A VEHICLE

CROSS-REFERENCE TO RELATED APPLICATIONS

This application claims the benefit of U.S. Provisional Patent Application No. 61/897,628 filed on Oct. 30, 2013, which is hereby incorporated by reference in its entirety.

TECHNICAL FIELD

The present disclosure is related to a buckle assembly for a vehicle.

SUMMARY

One possible aspect of the disclosure provides a buckle assembly for a vehicle. The buckle assembly includes a buckle member, an anchor bracket, and a webbing strap. The buckle member includes a connector that defines at least one buckle opening. The anchor bracket is disposed proximal to the buckle opening of the connector. The anchor bracket defines at least one anchor opening. The webbing strap includes a loop portion extending through the buckle opening and the anchor opening. The webbing strap further includes a first strap portion and a second strap portion. The loop portion interconnects the first strap portion and the second strap portion. The webbing strap presents a first side and a second side, opposing the first side. The first side of the first strap portion and the first side of the second strap portion are disposed in facing relationship to one another and a joint is formed therebetween.

In another aspect of the disclosure, a vehicle includes a panel, a seat member, and a buckle assembly. The seat member is operatively attached to the panel. The buckle assembly is operatively attached to the panel such that the buckle member is disposed adjacent the seat member. The buckle assembly includes a buckle member, an anchor bracket, and a webbing strap. The buckle member includes a connector that defines at least one buckle opening. The anchor bracket is disposed proximal to the buckle opening of the connector. The anchor bracket defines at least one anchor opening. The webbing strap includes a loop portion extending through the buckle opening and the anchor opening. The webbing strap further includes a first strap portion and a second strap portion. The loop portion interconnects the first strap portion and the second strap portion. The webbing strap presents a first side and a second side, opposing the first side. The first side of the first strap portion and the first side of the second strap portion are disposed in facing relationship to one another and a joint is formed therebetween.

The above features and advantages and other features and advantages of the present teachings are readily apparent from the following detailed description of the best modes for carrying out the present teachings when taken in connection with the accompanying drawings.

DETAILED DESCRIPTION

Figure 1:
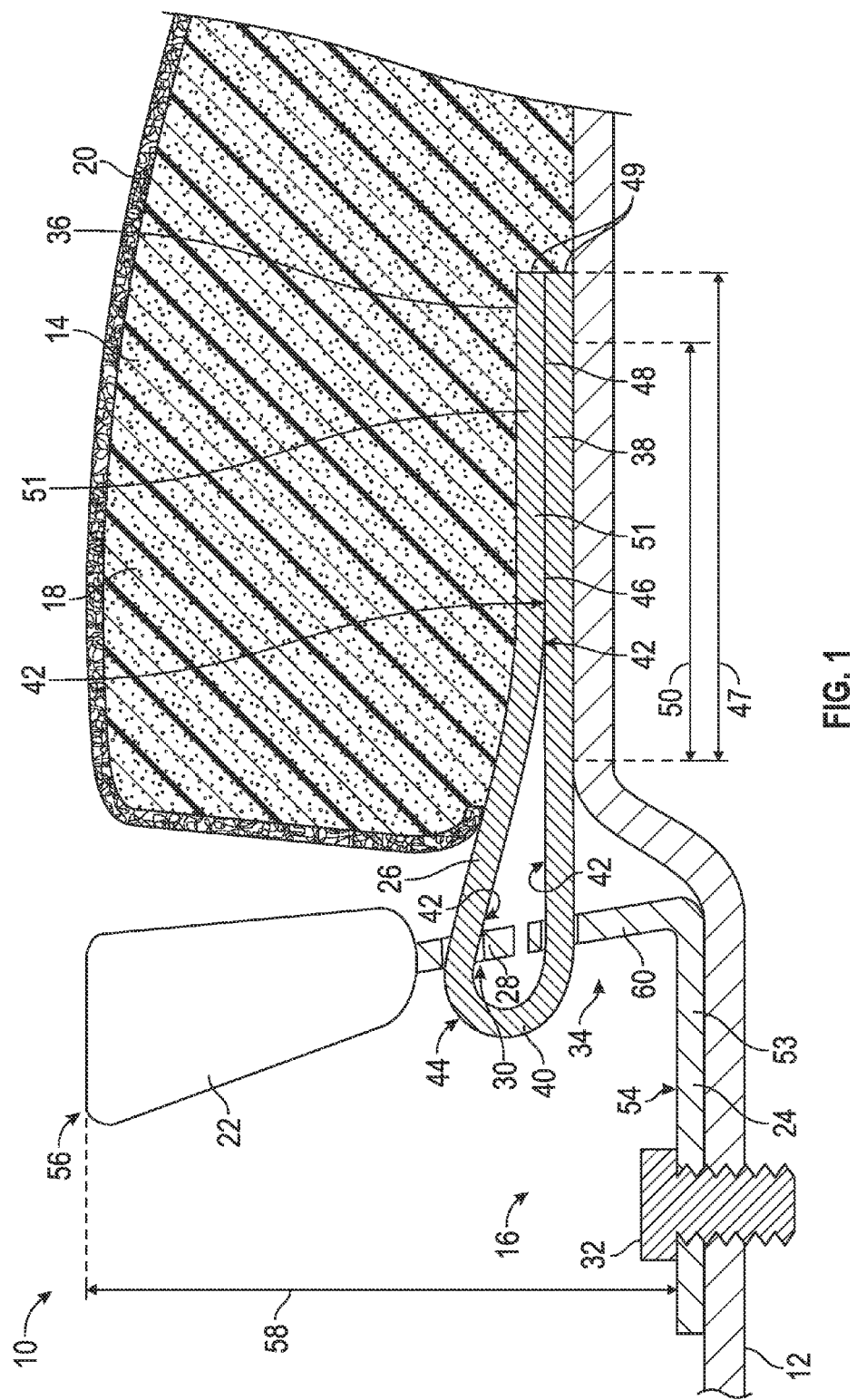
FIG. 1 is a schematic cross-sectional side view of a vehicle including a buckle assembly, a panel, and a seat member.

Referring to the drawings, wherein like reference numbers refer to like components throughout the several Figures, a buckle assembly 16 for a vehicle 10 is shown schematically in FIG. 1.

The vehicle 10 includes a panel 12, a seat member 14, and the buckle assembly 16. The panel 12 may be a floor panel and the like. The seat member 14 is operatively attached to the panel 12 of the vehicle 10. The seat member 14 is configured to provide a padding between an occupant of the vehicle 10 and the panel 12 that supports the seat member 14. The seat member 14 may include a cushion 18 that is covered with a cover layer 20, such as fabric, leather, vinyl, and the like. The cushion 18 may be formed of a foam material and the like.

The buckle assembly 16 is operatively attached to the panel 12. The buckle assembly 16 includes a buckle member 22, an anchor bracket 24, and a webbing strap 26. The buckle member 22 includes a connector 28 that defines at least one buckle opening 30. The anchor bracket 24 is operatively attached to the panel 12 of the vehicle 10 via a fastener 32, welding, and the like. The anchor bracket 24 is disposed in adjacent relationship to the buckle member 22. The anchor bracket 24 defines at least one anchor opening 34.

The webbing strap 26 may be formed from seatbelt webbing. The webbing strap 26 includes a first strap portion 36, a second strap portion 38, and a loop portion 40. More specifically, the loop portion 40 is part of the webbing strap 26 and interconnects the first strap portion 36 and the second strap portion 38. The webbing strap 26 presents a first side 42 and a second side 44, opposing the first side 42. The loop portion 40 of the webbing strap 26 extends through the buckle opening 30 of the connector 28 and the anchor opening 34 of the anchor bracket 24 to form a loop. The first side 42 of the first strap portion 36 and the first side 42 of the second strap portion 38 are disposed in facing relationship such that the first side 42 of the first strap portion 36 faces the first side 42 of the second strap portion 38. With continued reference to FIGS. 1 and 2, the first side 42 of the first strap portion 36 is disposed in abutting relationship to the first side 42 of the second strap portion 38 such that a joint 46 is formed therebetween. Referring to FIG. 1, the joint 46 extends laterally away from the buckle member 22 and the anchor bracket 24 such that the joint 46 is operatively disposed between the seat member 14 and the panel 12. More specifically, the joint 46 is operatively disposed between the cushion 18 of the seat member 14 and the panel 12. Referring again to FIGS. 1 and 2, the first strap portion 36 and the second strap portion 38 spans a length 47 from the loop portion 40 to a respective end 49. Further, with reference to FIG. 2, the first strap portion 36 and the second strap portion 38 each have a width 52 extending in perpendicular relationship to the length 47. The width 52 is less than the length 47. By way of a non-limiting example, the width 52 may be between 24 millimeters (mm) and 28 mm.

The joint 46 may be formed by sewing the first strap portion 36 to the second strap portion 38. With continued reference to FIG. 2, the joint 46 may be defined by a sewn pattern 48 having a distance 50 extending from the loop portion 40, along the abutted first and second strap portions 36, 38. The distance 50 of the sewn pattern 48 is less than the length 47. By way of a non-limiting example, the distance is between 63 mm and 100 mm. The sewn pattern 48 may be sewn such that a tension between the first strap portion 36 and the second strap portion 38 increases in magnitude from the loop portion 40, along the distance 50. More specifically, the tension is defined as the tension of thread 51 used in the sewn pattern 48. The joint 46 of the webbing strap 26 may be configured such that the buckle member 22 is substantially flexible relative to the anchor bracket 24.

Figure 2:
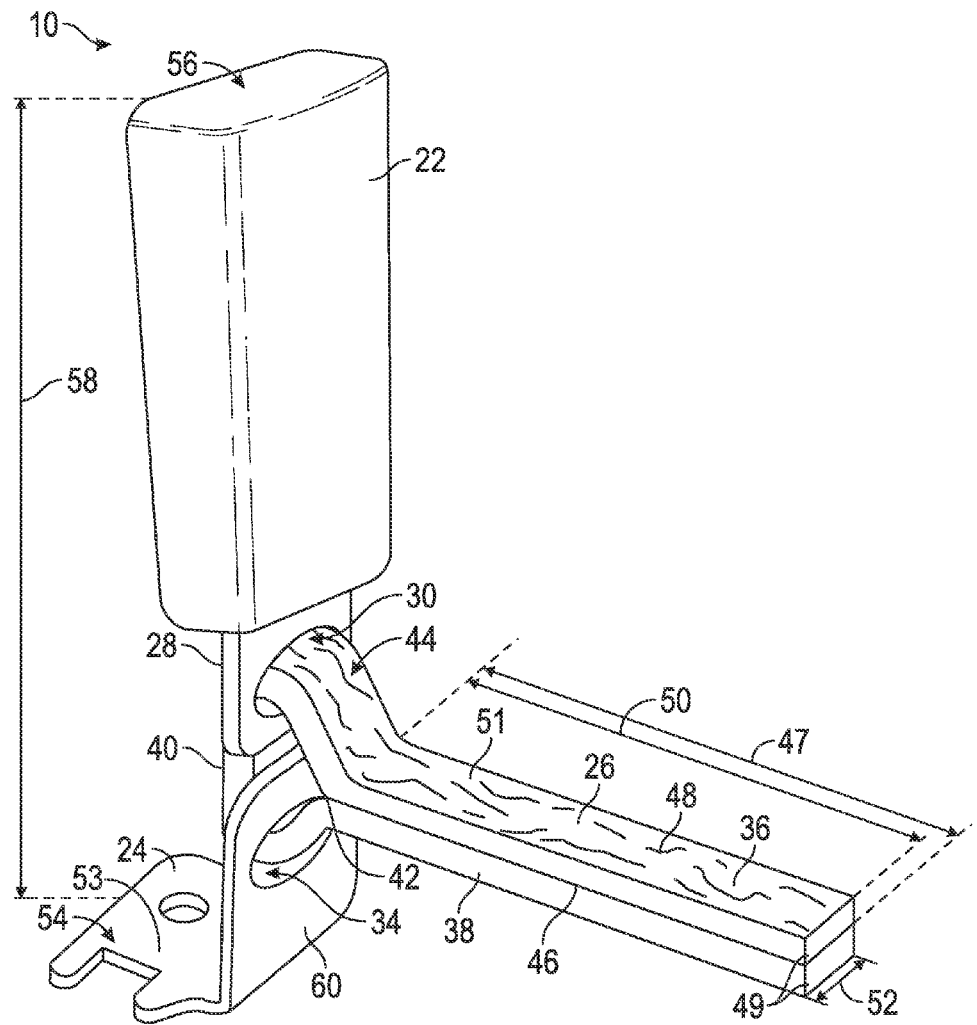
FIG. 2 is a schematic perspective view of the buckle assembly of FIG. 1.

Referring to FIGS. 1 and 2, the anchor bracket 24 includes a base portion 53 presenting an outer surface 54. The buckle member 22 includes an attachment end 56 disposed in opposition to the connector 28. The attachment end 56 is configured for receiving a tongue (not shown) of a seatbelt (not shown). The buckle assembly 16 defines a span 58 between the outer surface 54 and the attachment end 56. The webbing strap 26 is configured such that the span 58 is between 90 mm and 165 mm.

The anchor bracket 24 may also include an attachment portion 60 extending in generally perpendicular relationship from the base portion 53. The attachment portion 60 defines the anchor opening 34.

Figure 3:
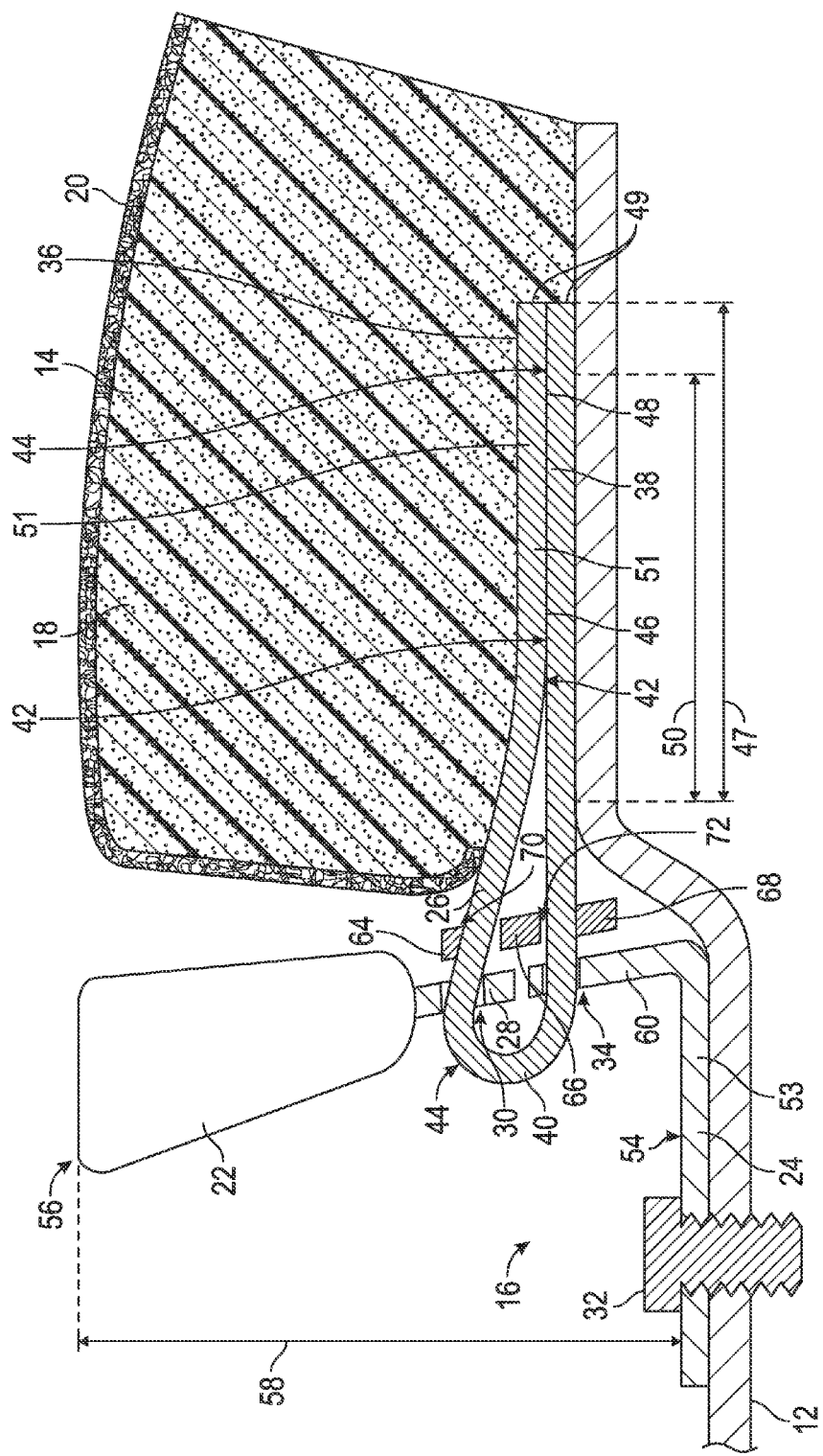
FIG. 3 is a schematic cross-sectional side view of a vehicle including the buckle assembly having a web plate.
Figure 4:
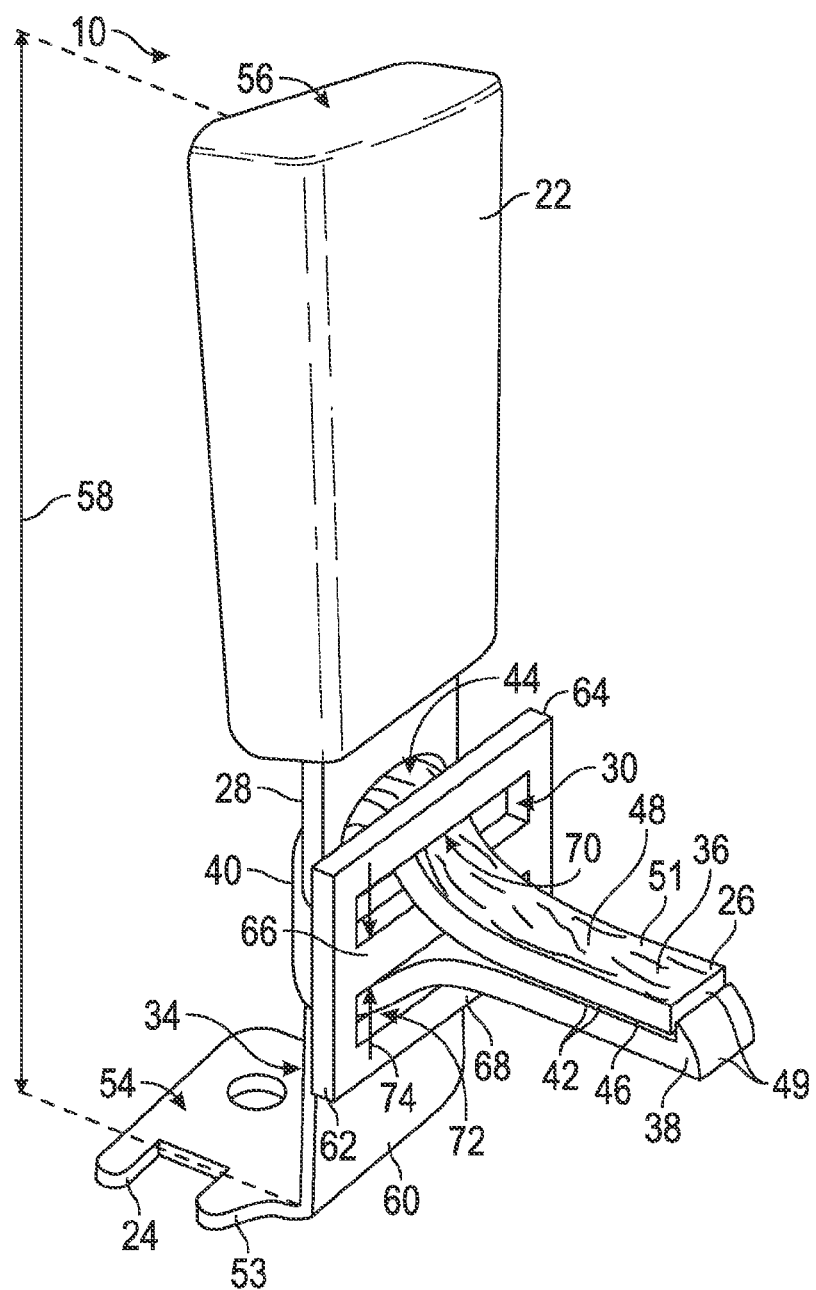
FIG. 4 is a schematic perspective view of the buckle assembly of FIG. 3.

Referring to FIGS. 3 and 4, the buckle assembly 16 may also include a web plate 62 operatively connected to the webbing strap 26 between the loop portion 40 and each of the first strap portion 36 and the second strap portion 38. The web plate 62 may be configured to resist peeling of the first strap portion 36 from the second strap portion 38 when the buckle member 22 is pulled in a direction away from the anchor bracket 24. The web plate 62 includes a first restraining portion 64, a center restraining portion 66, and a second restraining portion 68. The first restraining portion 64 and the center restraining portion 66 define a first slot 70 therebetween. The center restraining portion 66 and the second restraining portion 68 define a second slot 72 therebetween. The first slot 70 and the second slot 72 extend in spaced and generally parallel relationship to one another. The center restraining portion 66 may have a thickness 74 defined between the first slot 70 and the second slot 72 that is no greater than 3 mm. It should be appreciated that the center restraining portion 66 may have other thicknesses 74, as desired. The first strap portion 36 extends through the first slot 70 and the second strap portion 38 extends through the second slot 72 such that the first restraining portion 64 and the second restraining portion 68 restrict peeling of the first strap portion 36 from the second strap portion 38 when the buckle member 22 is pulled in the direction away from the anchor bracket 24. The web plate 62 is configured such that the buckle member 22 is substantially flexible relative to the anchor bracket 24.

With continued reference to FIG. 4, the second strap portion 38 may be folded back onto itself and the first strap portion 36 may be disposed in abutting relationship to the second side 44 of the second strap portion 38 to form the joint 46 therebetween. As such, the first side 42 of a portion of the first strap portion 36 is disposed in facing relationship to the first side 42 of the first strap portion 36 such that the joint 46 extends away from the buckle member 22 and the anchor bracket 24. More specifically, the joint 46 is disposed adjacent the buckle member 22 and the anchor bracket 24. It should be appreciated that the first and second strap portions 36, 38 may be folded onto themselves in other configurations, so long as the joint 46 extends laterally away from the buckle member 22 and the anchor bracket 24.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A buckle assembly for a vehicle, the buckle assembly comprising:
   a buckle member including a connector defining at least one buckle opening;
   an anchor bracket disposed proximal to the buckle opening of the connector, wherein the anchor bracket defines a at least one anchor opening; and
   a webbing strap including a loop portion extending through the buckle opening and the anchor opening, the webbing strap further including a first strap portion and a second strap portion;
   wherein the loop portion interconnects the first strap portion and the second strap portion;
   wherein the webbing strap presents a first side and a second side, opposing the first side;
   wherein the first side of the first strap portion and the first side of the second strap portion are disposed in facing and abutting relationship to one another and a joint is formed therebetween such that the joint extends laterally away from each of the buckle member and the anchor bracket; and
   a web plate operatively connected to the webbing strap between the loop portion and each of the first strap portion and the second strap portion;
   wherein the web plate includes a first restraining portion, a center restraining portion, and a second restraining portion;
   wherein the first restraining portion and the center restraining portion define a first slot therebetween;
   wherein the center restraining portion and the second restraining portion define a second slot therebetween;
   wherein the first slot and the second slot extend in spaced and generally parallel relationship to one another; and
   wherein the first strap portion extends through the first slot and the second strap portion extends through the second slot such that the first restraining portion and the second restraining portion restrict peeling of the first strap portion from the second strap portion.

2. A buckle assembly, as set forth in claim 1, wherein the joint is formed by sewing the first strap portion to the second strap portion.

3. A buckle assembly, as set forth in claim 2, wherein the joint is defined by a sewn pattern having a distance extending from the loop portion, along the abutted first and second strap portions.

4. A buckle assembly, as set forth in claim 3, wherein the sewn pattern has a tension that increases in magnitude from the loop portion, along the distance of the abutted first and second strap portions.

5. A buckle assembly, as set forth in claim 4, wherein each of the first strap portion and the second strap portion spans a length from the loop portion to a respective end;
   wherein each of the first strap portion and the second strap portion have a width extending in perpendicular relationship to the length; and
   wherein the width is less than the length.

6. A buckle assembly, as set forth in claim 5, wherein the distance of the sewn pattern is less than the length of each of the first and second strap portions.

7. A buckle assembly, as set forth in claim 6, wherein the distance of the sewn pattern is less than 64 millimeters.

8. A buckle assembly, as set forth in claim 1, wherein the anchor bracket includes a base portion presenting an outer surface;

wherein the buckle member includes an attachment end disposed in opposition to the connector;

wherein the buckle assembly defines a span between the outer surface and the attachment end; and wherein the webbing strap is configured such that the span is between 90 millimeters and 165 millimeters.

9. A buckle assembly, as set forth in claim 8, wherein the anchor bracket includes an attachment portion extending in generally perpendicular relationship from the base portion;

wherein the attachment portion defines the anchor opening.

10. A vehicle comprising:

a panel;

a seat member operatively attached to the panel; and a buckle assembly operatively attached to the panel such that the buckle member is disposed adjacent the seat member, the buckle assembly including:

a buckle member including a connector defining at least one buckle opening;

an anchor bracket operatively attached to the panel and disposed proximal to the buckle opening of the connector, wherein the anchor bracket defines at least one anchor opening; and a webbing strap including a loop portion extending through the buckle opening and the anchor opening, the webbing strap further including a first strap portion and a second strap portion;

wherein the loop portion interconnects the first strap portion and the second strap portion;

wherein the webbing strap presents a first side and a second side, opposing the first side; and wherein the first side of the first strap portion and the first side of the second strap portion are disposed in facing and abutting relationship to one another and a joint is formed therebetween such that the joint extends laterally away from each of the buckle member and the anchor bracket; and a web plate operatively connected to the webbing strap between the loop portion and each of the first strap portion and the second strap portion;

wherein the web plate includes a first restraining portion, a center restraining portion, and a second restraining portion;

wherein the first restraining portion and the center restraining portion define a first slot therebetween;

wherein the center restraining portion and the second restraining portion define a second slot therebetween;

wherein the first slot and the second slot extend in spaced and generally parallel relationship to one another; and wherein the first strap portion extends through the first slot and the second strap portion extends through the second slot such that the first restraining portion and the second restraining portion restrict peeling of the first strap portion from the second strap portion.

11. A vehicle, as set forth in 10, wherein the joint is formed by sewing the first strap portion to the second strap portion.

12. A vehicle, as set forth in claim 11, wherein the joint is defined by a sewn pattern having a distance extending from the loop portion, along the abutted first and second strap portions.

13. A vehicle, as set forth in claim 12, wherein the sewn pattern has a tension that increases in magnitude from the loop portion, along the distance of the first and second strap portions.

14. A vehicle, as set forth in claim 13, wherein each of the first strap portion and the second strap portion spans a length from the loop portion to a respective end;

wherein each of the first strap portion and the second strap portion have a width extending in perpendicular relationship to the length; and wherein the width is less than the length.

15. A vehicle, as set forth in claim 10, wherein the anchor bracket includes a base portion presenting an outer surface;

wherein the buckle member includes an attachment end disposed in opposition to the connector;

wherein the buckle assembly defines a span between the outer surface and the attachment end; and wherein the webbing strap is configured such that the span is between 90 millimeters and 165 millimeters.

16. A vehicle, as set forth in claim 10, further comprising a web plate operatively connected to the webbing strap between the loop portion and each of the first strap portion and the second strap portion;

wherein the web plate includes a first restraining portion, a center restraining portion, and a second restraining portion;

wherein the first restraining portion and the center restraining portion define a first slot therebetween;

wherein the center restraining portion and the second restraining portion define a second slot therebetween;

wherein the first slot and the second slot extend in spaced and generally parallel relationship to one another; and wherein the first strap portion extends through the first slot and the second strap portion extends through the second slot such that the first restraining portion and the second restraining portion restrict peeling of the first strap portion from the second strap portion.

17. A buckle assembly for a vehicle, the buckle assembly comprising:

a buckle member including a connector defining at least one buckle opening;

an anchor bracket disposed proximal to the buckle opening of the connector, wherein the anchor bracket defines at least one anchor opening;

a webbing strap including a loop portion extending through the buckle opening and the anchor opening, the webbing strap further including a first strap portion and a second strap portion;

wherein the loop portion interconnects the first strap portion and the second strap portion;

wherein the webbing strap presents a first side and a second side, opposing the first side;

wherein the first side of the first strap portion and the first side of the second strap portion are disposed in facing relationship to one another and a joint is formed therebetween; and a web plate operatively connects to the webbing strap between the loop portion and each of the first strap portion and the second strap portion;

wherein the web plate includes a first restraining portion, a center restraining portion, and a second restraining portion;

wherein the first restraining portion and the center restraining portion define a first slot therebetween;

wherein the center restraining portion and the second restraining portion define a second slot therebetween;

wherein the first slot and the second slot extend in spaced and generally parallel relationship to one another; and wherein the first strap portion extends through the first slot and the second strap portion extends through the second slot such that the first restraining portion and the second restraining portion restrict peeling of the first strap portion from the second strap portion.

\* \* \* \* \*